United States Patent
Hall, Jr. et al.

[11] Patent Number: 6,151,163
[45] Date of Patent: Nov. 21, 2000

[54] HOLOGRAPHIC PROJECTION SCREEN HAVING A REAR-FACING FRESNEL LENS

[75] Inventors: Estill Thone Hall, Jr., Fishers; Wendy Rene Pfile, Indianapolis, both of Ind.

[73] Assignee: Thomson Licensing S.A., Boulogne Cedex, France

[21] Appl. No.: 09/151,455

[22] Filed: Sep. 10, 1998

Related U.S. Application Data

[60] Provisional application No. 60/058,467, Sep. 10, 1997.

[51] Int. Cl.$^7$ .............................. G03B 21/56; G03B 21/60
[52] U.S. Cl. ........................................... 359/457; 359/460
[58] Field of Search ............................ 359/1, 443, 454, 359/457, 460, 15, 19, 456

[56] References Cited

U.S. PATENT DOCUMENTS

| | | | |
|---|---|---|---|
| 3,625,584 | 12/1971 | St. John | 350/3.5 |
| 4,130,337 | 12/1978 | Okoshi | 350/3.76 |
| 4,219,843 | 8/1980 | Takahashi | 358/60 |
| 4,374,609 | 2/1983 | Lange | 350/128 |
| 4,443,814 | 4/1984 | Mori et al. | 358/60 |
| 4,520,387 | 5/1985 | Cortellini | 358/90 |
| 4,536,056 | 8/1985 | Oguino | 350/128 |
| 4,566,756 | 1/1986 | Heijnemans | 350/126 |
| 4,752,116 | 6/1988 | Sekiguchi | 350/128 |
| 5,046,793 | 9/1991 | Hockley et al. | 359/12 |
| 5,196,960 | 3/1993 | Matsuzaki et al. | 359/453 |
| 5,206,761 | 4/1993 | Ogino | 359/457 |
| 5,241,416 | 8/1993 | Mitsutake et al. | 359/456 |
| 5,257,130 | 10/1993 | Monroe | 359/478 |
| 5,365,354 | 11/1994 | Jannson et al. | 359/15 |
| 5,442,482 | 8/1995 | Johnson et al. | 359/619 |
| 5,576,853 | 11/1996 | Molteni et al. | 359/12 |
| 5,760,955 | 6/1998 | Goldenberg et al. | 359/456 |
| 5,796,499 | 8/1998 | Wenyon | 359/15 |
| 5,844,715 | 12/1998 | Park et al. | 389/457 |
| 5,877,893 | 3/1999 | Kim | 359/456 |
| 5,889,612 | 3/1999 | Van De Ven | 359/453 |
| 5,930,037 | 7/1999 | Imai | 359/463 |

FOREIGN PATENT DOCUMENTS

| | | | |
|---|---|---|---|
| 0 349 884 A2 | 1/1990 | European Pat. Off. | G02B 5/32 |
| 0 349 947 A2 | 1/1990 | European Pat. Off. | G02B 5/02 |
| 0 479 490 A2 | 4/1992 | European Pat. Off. | G02B 5/32 |
| 0 484 073 A2 | 5/1992 | European Pat. Off. | G03B 21/62 |
| 0 629 899 A1 | 12/1994 | European Pat. Off. | G03B 21/62 |
| 0 671 653 A1 | 9/1995 | European Pat. Off. | G03B 21/62 |
| 0 676 902 A2 | 10/1995 | European Pat. Off. | H04N 9/31 |
| 4-136885 | 5/1992 | Japan | G03H 1/26 |
| 5-53195 | 3/1993 | Japan | G03B 21/00 |
| 6-82625 | 3/1994 | Japan | G02B 5/32 |
| 8-292498 | 11/1996 | Japan | G03B 21/62 |
| 9-73132 | 3/1997 | Japan | G03B 21/62 |
| 9-73133 | 3/1997 | Japan | G03B 21/62 |
| 9-113995 | 5/1997 | Japan | G03B 21/10 |
| 9-114354 | 5/1997 | Japan | G03H 1/22 |
| 92/09918 | 6/1992 | WIPO | G03B 21/10 |
| 95/34832A1 | 12/1995 | WIPO | G02B 5/32 |
| 96/07953A1 | 3/1996 | WIPO | G03B 21/62 |
| 97/10523A1 | 3/1997 | WIPO | G02B 5/32 |

OTHER PUBLICATIONS

International Search Report for international application number PCT/ US 98/ 01735.
International Search Report for international application number PCT/ US 98/ 01751.
International Search Report for international application number PCT/ US 98/ 01616.
International Search Report for international application number PCT/ US 98/ 01617.
International Search Report for international application number PCT/ US 97/ 22782.

*Primary Examiner*—Safet Metjahic
*Assistant Examiner*—Christopher E. Mahoney
*Attorney, Agent, or Firm*—Joseph S. Tripoli; Joseph J. Laks; Harvey D. Fried

[57] ABSTRACT

A screen for a projection-type video display apparatus. A linear-type Fresnel lens has a lens pattern on a first side for receiving light energy from a light source. A second side of the Fresnel lens is opposite the first side. The light energy exits the Fresnel lens from the second side. A hologram is affixed to the second side of the Fresnel lens for managing the dispersion of the light energy exiting from the second side of the Fresnel lens. The hologram is affixed to the Fresnel lens by any of various lamination processes.

9 Claims, 4 Drawing Sheets

46" SYSTEM WITH 46" LINEAR, FRONT-FACING, FRESNEL LENS:

| POINT | W | % OF CENTER | MEANS |
|---|---|---|---|
| CTR | 132.6 | 100.00 | MAJOR AXIS |
| 3 | 28.2 | 21.29 | 21.76 |
| 9 | 29.5 | 22.24 | MINOR AXIS |
| 6 | 26.1 | 19.71 | 21.87 |
| 12 | 31.9 | 24.03 | CORNER |
| 2 | 19.3 | 14.54 | 13.18 |
| 4 | 17.8 | 13.45 | |
| 8 | 14.9 | 11.26 | |
| 10 | 17.8 | 13.45 | |

46" SYSTEM WITH 46" LINEAR, REAR-FACING, FRESNEL LENS:

| POINT | W | % OF CENTER | MEANS |
|---|---|---|---|
| CTR | 132.2 | 100.00 | MAJOR AXIS |
| 3 | 28.5 | 21.57 | 21.83 |
| 9 | 29.2 | 22.10 | MINOR AXIS |
| 6 | 40.1 | 30.33 | 33.34 |
| 12 | 48.1 | 36.35 | CORNER |
| 2 | 13.1 | 9.92 | 8.79 |
| 4 | 12.5 | 9.48 | |
| 8 | 9.6 | 7.28 | |
| 10 | 11.2 | 8.47 | |

52" SYSTEM WITH 46" LINEAR, FRONT-FACING, FRESNEL LENS:

| POINT | W | % OF CENTER | MEANS |
|---|---|---|---|
| CTR | 112.7 | 100.00 | MAJOR AXIS |
| 3 | 27.6 | 24.53 | 23.98 |
| 9 | 26.4 | 23.44 | MINOR AXIS |
| 6 | 40.5 | 35.96 | 36.86 |
| 12 | 42.6 | 37.76 | CORNER |
| 2 | 16.5 | 14.68 | 12.61 |
| 4 | 13.6 | 12.09 | |
| 8 | 11.7 | 10.35 | |
| 10 | 15.0 | 13.32 | |

*FIG. 5c*

52" SYSTEM WITH 46" LINEAR, REAR-FACING, FRESNEL LENS:

| POINT | W | % OF CENTER | MEANS |
|---|---|---|---|
| CTR | 112.8 | 100.00 | MAJOR AXIS |
| 3 | 27.5 | 24.41 | 23.97 |
| 9 | 26.5 | 23.53 | MINOR AXIS |
| 6 | 28.0 | 24.79 | 24.73 |
| 12 | 27.8 | 24.66 | CORNER |
| 2 | 6.8 | 6.05 | 5.16 |
| 4 | 5.6 | 4.98 | |
| 8 | 4.7 | 4.13 | |
| 10 | 6.2 | 5.48 | |

*FIG. 5d*

46" SYSTEM WITH 52" LINEAR, FRONT-FACING, FRESNEL LENS:

| POINT | W | % OF CENTER | MEANS |
|---|---|---|---|
| CTR | 132.3 | 100.00 | MAJOR AXIS |
| 3 | 30.2 | 22.84 | 22.41 |
| 9 | 29.1 | 21.99 | MINOR AXIS |
| 6 | 16.1 | 12.17 | 13.58 |
| 12 | 19.8 | 14.99 | CORNER |
| 2 | 14.9 | 11.26 | 10.31 |
| 4 | 14.1 | 10.67 | |
| 8 | 12.3 | 9.27 | |
| 10 | 13.3 | 10.05 | |

46" SYSTEM WITH 52" LINEAR, REAR-FACING, FRESNEL LENS:

| POINT | W | % OF CENTER | MEANS |
|---|---|---|---|
| CTR | 131.6 | 100.00 | MAJOR AXIS |
| 3 | 30.2 | 22.96 | 22.52 |
| 9 | 29.1 | 22.07 | MINOR AXIS |
| 6 | 28.2 | 21.44 | 24.32 |
| 12 | 35.8 | 27.20 | CORNER |
| 2 | 15.1 | 11.46 | 10.36 |
| 4 | 14.6 | 11.10 | |
| 8 | 12.6 | 9.59 | |
| 10 | 12.2 | 9.28 | |

HOLOGRAPHIC PROJECTION SCREEN HAVING A REAR-FACING FRESNEL LENS

CROSS-REFERENCE TO RELATED APPLICATIONS

This application claims the benefit of U.S. Provisional Application No. 60/058,467, filed on Sep. 10, 1997.

FIELD OF THE INVENTION

This invention relates generally to the field of projection-type video display apparatus, and, in particular, to projection-type video display apparatus having screens that utilize holograms in conjunction with Fresnel lenses.

BACKGROUND INFORMATION

A conventional projection-type video display apparatus 10 is illustrated in FIG. 1. An array 12 of projection cathode-ray tubes 14, 16, and 18 provide red, green, and blue images respectively. The cathode-ray tubes are provided with respective lenses 15, 17, and 19. The projected images are reflected by a mirror 20 onto a projection screen 22. Additional mirrors can also be utilized, depending on the particular geometry of the optical paths. The green cathode-ray tube 16 projects the green image along an optical path 32, which in this example is oriented substantially orthogonal to screen 22. In other words, the centerline of the optical path is at right angles to the screen. The red and blue cathode-ray tubes have respective optical paths 34 and 36, which converge toward the first optical path 32 in a non-orthogonal orientation defining angles of incidence α.

Screens for projection-type video display apparatus are generally manufactured by an extrusion process utilizing one or more patterned rollers to shape the surface of a thermoplastic sheet material. The configuration is generally an array of lenticular elements, also referred to as lenticules and lenslets. The lenticular elements may be formed on one or both sides of the same sheet material, or on one side only of different sheets, which can then be permanently combined as a laminated unit or otherwise mounted adjacent to one another so as to function as a laminated unit. In many designs, one of the surfaces of the screen is configured as a Fresnel lens to provide light diffusion.

The screen 22 of FIG. 1, however, comprises a three-dimensional hologram 26 disposed on a substrate 24. Such a screen was disclosed in Applicants' co-pending and commonly assigned U.S. patent application Ser. No. 08/777,887, filed on Dec. 31, 1996, and entitled PROJECTION TELEVISIONS WITH THREE DIMENSIONAL SCREENS, which application is herein incorporated by reference. The hologram 26 is a print of a master hologram substantially forming a diffraction pattern that manages the distribution of light energy from the three projectors 14, 16, 18, and can be made variable across the width and/or height of the screen. The screen receives images from the projectors on an entrance surface side 28 and displays the images on an exit surface side 30, with controlled light dispersion of all the displayed images. The three-dimensional hologram 26 has a thickness of not more than approximately 20 microns.

The substrate 24 is preferably a highly durable, transparent, water-repellent film, such as a polyethylene terephthalate resin film. One such film is available from E. I. du Pont de Nemours & Co. under the trademark Mylar®. The film substrate has a thickness in the range of about 1–10 mils, equivalent to about 0.001–0.01 inches or about 25.4–254 microns. A film having a thickness of about 7 mils has been found to provide adequate support for the three-dimensional hologram disposed thereon. The thickness of the film does not affect screen performance in general, or color shift performance in particular, and films of different thickness may be utilized.

The screen 22 may further comprise a light transmissive reinforcing member 38, for example, of an acrylic material, such as polymethylmethacrylate (PMMA). Polycarbonate materials can also be used. The reinforcing member 38 is presently a layer having a thickness in the range of approximately 2–4 mm. The screen 22 and the reinforcing member are adhered to one another throughout the mutual boundary 40 of the holographic layer 26 and the reinforcing member 38. Adhesive, radiation, and/or thermal bonding techniques may be utilized. The surface 42 of the reinforcing layer may also be treated, for example by one or more of the following: tinting, anti-glare coatings, and anti-scratch coatings.

Various surfaces of the screen and/or its constituent layers may be provided with other optical lenses or lenticular arrays to control particular performance characteristics of the projection screen, as is known to do with conventional projection screens. For example, the screen 22' may comprise a Fresnel lens 50 having a lens pattern 51 in physical contact with the entrance surface side 28 of the screen 22, as shown in FIG. 2. The lens pattern 51 has a plurality of horizontal ridges 52, which are parallel to one another along the width of the Fresnel lens 50, as shown in FIG. 3. As is well known to one having ordinary skill in the art, a lubricant is used between the Fresnel lens 50 and the substrate 24, and tape is used around the edges of the Fresnel lens 50 and the substrate 24 to fasten those two components together.

The embodiment of the screen 22 shown in FIG. 2 provides significantly improved performance over conventional screens: color shift performance is significantly improved; visibility is good over a larger range of horizontal viewing angles; a higher screen gain yields an increase in the overall brightness of the resulting image on the screen; the overall brightness is more uniform; and a higher resolution is possible. This performance, however, entails a significant manufacturing cost. For example, fastening the Fresnel lens 50 to the screen 22 to provide the screen 22' shown in FIG. 2 may contribute approximately 15% to 20% in material and labor costs to the cost of the screen 22'. This amount is significant, and is enough to render the screen 22' commercially impracticable.

SUMMARY

The present invention is directed to a screen for a projection television receiver or monitor, which screen provides good performance characteristics at a cost that renders manufacture of the screen commercially practicable.

According to an inventive arrangement taught herein, a screen for a projection-type video display apparatus comprises a hologram affixed to a Fresnel lens for managing the dispersion of light energy from the Fresnel lens. The hologram may be affixed to the Fresnel lens by a lamination process.

According to another inventive arrangement taught herein, a screen for a projection-type video display apparatus comprises: a Fresnel lens having a lens pattern on a first side for receiving light energy from a light source, and a second side from which the light energy exits the Fresnel lens, the second side being opposite the first side; and a hologram for managing the dispersion of the light energy exiting the second side of the Fresnel lens. The Fresnel lens may be of the linear type.

According to a further aspect of the inventive arrangement taught herein, a screen for a projection-type video display apparatus comprises: a linear-type Fresnel lens having a lens pattern on a first side for receiving light energy from a light source, and a second side from which the light energy exits the Fresnel lens, the second side being opposite the first side; and a hologram laminated to the second side of the Fresnel lens for managing the dispersion of the light energy exiting from the second side of the Fresnel lens.

The above, and other features, aspects, and advantages of the present invention will become apparent from the following description read in conjunction with the accompanying drawings, in which like reference numerals designate the same elements.

BRIEF DESCRIPTION OF THE DRAWINGS

In the drawings:

FIG. 4 shows a side view of a screen for a projection television receiver according to the inventive arrangements described herein;

FIGS. 5a–5f present empirical data representative of the screen of FIG. 4; and

FIG. 6 shows the points at which the data of FIGS. 5a–5f were taken.

DESCRIPTION OF THE PREFERRED EMBODIMENTS

Figures 4, 5A, 5B:
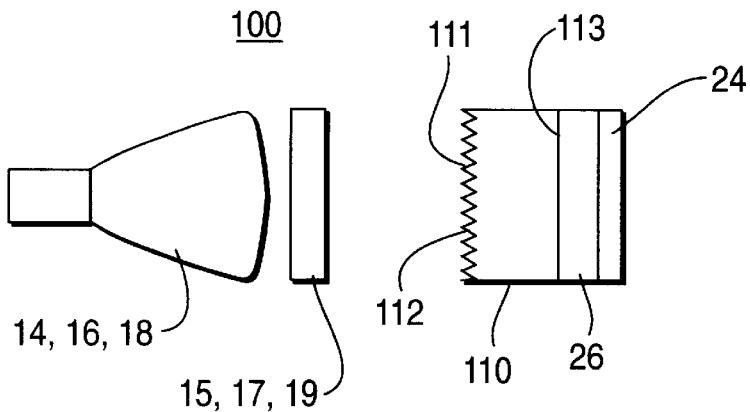
Figures 5E, 5F, 6:
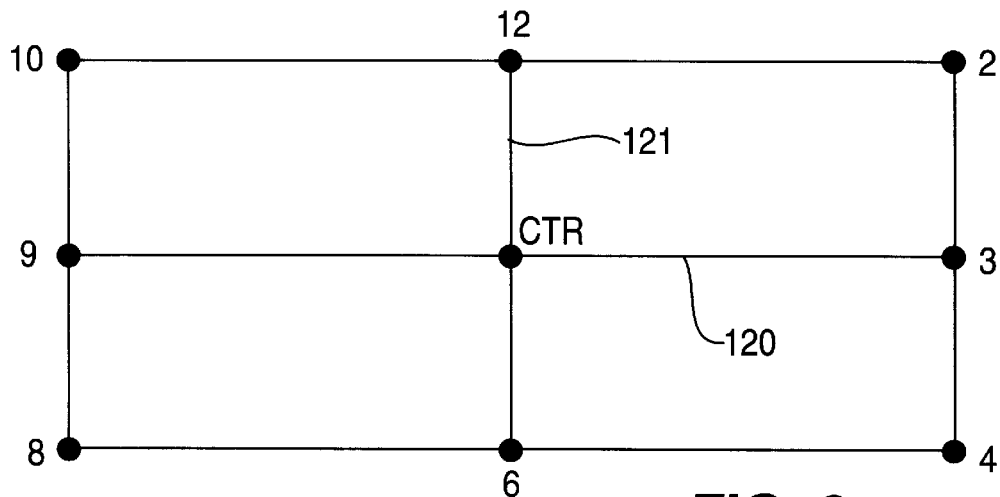

FIG. 4 shows a side view of a screen 100 that reconciles the goals of good performance and commercial practicability. The screen 100 has a linear Fresnel lens 110 which has a plurality of horizontal ridges 112 forming a lens pattern 111 that is oriented toward a light source of the projection television receiver. A circular Fresnel lens may also be used in the embodiment of FIG. 4, although a linear Fresnel lens is presently preferred because it is less expensive than a circular Fresnel lens. The light source comprises one of the cathode-ray tubes 14, 16, or 18 of the projection television receiver 10, along with its associated lens 15, 17, or 19, respectively.

The lens pattern 111 of the Fresnel lens 110 is designed to vary vertically so that the vertical component of the light exiting the Fresnel lens 110 is paralleled. When the Fresnel lens 110 is oriented such that its lens pattern 111 is facing toward the light source, the Fresnel lens 110 is said to be facing the "rear" or "backward" direction, and the side of the Fresnel lens 110 that faces toward the light source is referred to as the "back" or "rear" side of the lens. Conversely, the side of the Fresnel lens that is opposite the back side, and through which the light exits the Fresnel lens 110, is referred to as the "front" side.

The Fresnel lens 110 in the presently preferred embodiment shown in FIG. 4 is fabricated using an acrylic material. The lens pattern 111 is extruded, embossed, or molded onto the back side of the acrylic material. It is presently preferred, from the standpoint of minimizing the cost of the screen 100, to extrude the lens pattern 111 onto the back side of the acrylic material. In an alternative embodiment for the screen 100, the lens pattern 111 may be embossed on a layer of polyethylene material to provide a thinner, and less expensive, Fresnel lens 110. In a further alternative embodiment for the screen 100, the Fresnel lens 110 may comprise a holographic Fresnel lens rather than a mechanical Fresnel lens having a lens pattern 111. Such holographic Fresnel lenses are well known to those having ordinary skill in the art.

The hologram 26 and its substrate 24 are then affixed to the front side 113 of the Fresnel lens 110 by any of various lamination processes—excluding, perhaps, high-temperature lamination processes—that are well known to those having ordinary skill in the art. The hologram 26 is sandwiched between the front side 113 of the Fresnel lens 110 and the substrate 24. The substrate 24 thus provides a measure of protection against physical damage for the hologram 26. The hologram 26 then parallels the horizontal component of the light that is incident upon it from the front side 113 of the Fresnel lens 110. The hologram 26 also advantageously corrects the color shift of the screen 100 and redistributes the total light envelope, both horizontally and vertically, throughout the screen 100.

Figure 1:
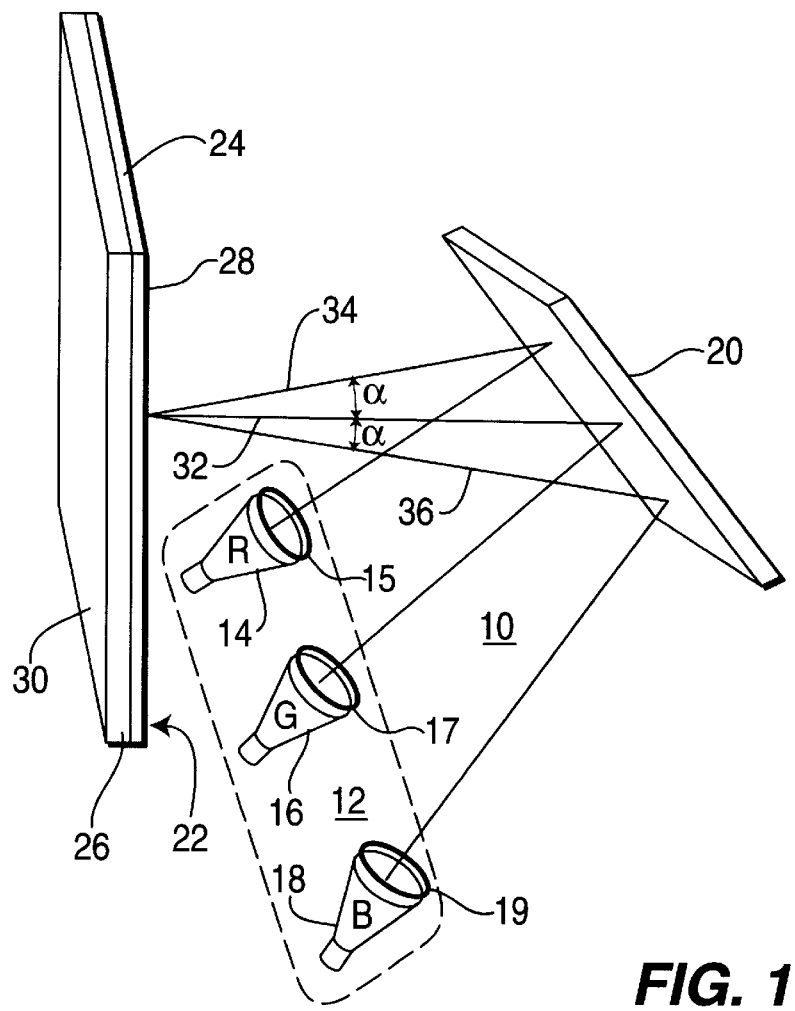
FIG. 1 is a diagrammatic representation of a projection television receiver.
Figure 2:
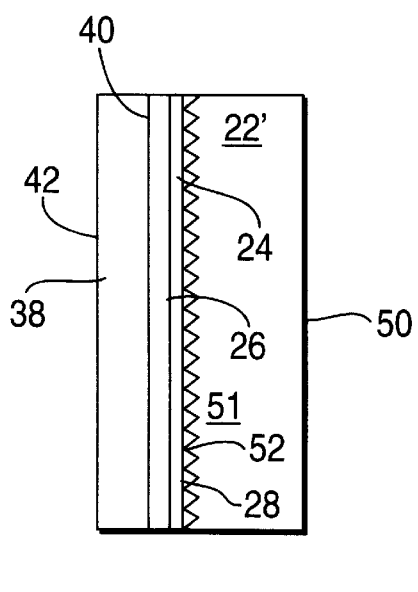
FIG. 2 shows one possible arrangement for a screen for a projection television receiver.
Figure 3:
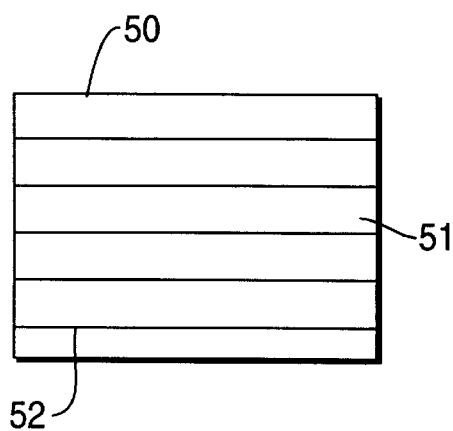
FIG. 3 shows a front view of a Fresnel lens used in the arrangement of FIG. 2.

The inventive arrangement shown in FIG. 4 advantageously eliminates from the screen 100 the reinforcing member 38 required by the screen 22' of FIG. 2. The cost of the screen 100 is thereby reduced to a level that renders the screen commercially practicable. The elimination of the reinforcing member 38 further provides the advantage that the resulting screen 100 is thinner than the screen 22'. For example, the screen 100 may have a thickness equal to approximately 2 millimeters, whereas a conventional screen may have a thickness equal to approximately 3.5 millimeters. As is well known to those having ordinary skill in the art, a thinner screen structure is preferable because it reduces the "double image" problem that is associated with screens for projection televisions.

It is not intuitive that the performance characteristics of the arrangement of FIG. 2, with its front-facing Fresnel lens, can be replicated by the arrangement of FIG. 4, with its rear-facing Fresnel lens. It is a well-known phenomenon that the light is not always incident on the ridges of the lens pattern 111 in a desired manner. As a result, one might expect a decrease in brightness from the center to the edge of a rear-facing Fresnel lens to be greater than a decrease in brightness from the center to the edge for that same Fresnel lens facing forward. Indeed, the decrease in center-to-edge brightness was a major concern in the implementation of the inventive arrangement shown in FIG. 4.

Empirical data collected by the inventors, however, indicated that the decrease in center-to-edge brightness is not so severe for a rear-facing linear Fresnel lens. The center-to-edge brightness was measured for three different conditions: (i) a Fresnel lens with a 46-inch focal length in a 46-inch projection television system (i.e., the focal length is correct); (ii) a Fresnel lens with a 52-inch focal length in a 46-inch projection television system (i.e., the focal length is too large); and (iii) a Fresnel lens with a 46-inch focal length in a 52-inch projection television system (i.e., the focal length is too short). In each condition, the center-to-edge brightness was measured for the Fresnel lens in both the front- and rear-facing directions. In conditions (i) and (iii), the brightness was measured at a distance of eight feet from the screen; for condition (ii), the brightness was measured at a distance of nine feet from the screen. In each condition, a small strip of a production-type circular Fresnel lens was used to simulate a linear Fresnel lens.

The data are shown in FIGS. 5a–5f. The points on the screen for which measurements were taken are shown in FIG. 6. The white brightness W is measured in units of foot-lamberts. The brightness W at each point is also measured as a percentage of the brightness at the center of the screen. The arithmetic means for the major and minor axes and the corners are also calculated. The mean for the major axis 120 is the average of the brightness measurements at points 3 and 9 on FIG. 6. The mean for the minor axis 121 is the average of the brightness measurements at points 6 and 12 on FIG. 6. The mean for the corners is the average of the brightness measurements at points 2, 4, 8, and 10 on FIG. 6.

The data shown in FIGS. 5a–5f indicate that the best corner brightness for a rear-facing linear Fresnel lens is at a longer focal length than one would choose for a front-facing linear Fresnel lens, albeit at the expense of minor axis brightness. One unexpected discovery revealed by the data is that the minor axis brightness is actually enhanced by the rear-facing orientation of the linear Fresnel lens. This enhanced minor axis brightness advantageously provides the designer with a new design tradeoff between, on the one hand, the focal length at the top and bottom of the linear Fresnel lens and, on the other hand, the decrease in brightness from the minor axis of the linear Fresnel lens to the corner.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A screen for a projection-type video display apparatus, said screen comprising:

a first light transmissive layer having first and second sides opposite one another;

a Fresnel lens formed on said first side of said first light transmissive layer;

a three-dimensional hologram affixed to said second side of said first light transmissive layer for controlling color shift of light received from said Fresnel lens through said first light transmissive layer;

a second light transmissive layer affixed to said hologram on a side of said hologram opposite said Fresnel lens, said second light transmissive layer having a second side opposite said first side and forming an image viewing surface; and, said Fresnel lens, said first light transmissive layer, said hologram and said second light transmissive layer together forming a laminated screen, respective images projected onto said Fresnel lens of said screen being viewable as a composite image on said viewing surface.

2. The screen of claim 1, wherein said Fresnel lens comprises an array of lenticular elements extending from said first side of said first light transmissive.

3. The screen of claim 1, wherein said first light transmissive layer comprises a holographic Fresnel lens.

4. The screen of claim 1, wherein said hologram and said first light transmissive layer are affixed along a flat interface.

5. A video projection display apparatus, comprising:

a plurality of video image projectors operating with respective colors;

a Fresnel lens positioned in a rearwardly facing direction for receiving and aligning light rays defining images projected from said video image projectors onto said Fresnel lens; and, a three-dimensional hologram disposed on a first side of a substrate and positioned for receiving said aligned light rays from said Fresnel lens, said hologram controlling color shift performance of said images received from said Fresnel lens and transmitting said color shift controlled images into said substrate, said images being viewable on a second side of said substrate, whereby minor axis brightness of said viewed images is improved by said rearwardly facing direction of said Fresnel lens.

6. The apparatus of claim 5, wherein one side of said hologram is formed integrally on said substrate and an opposite side of said hologram is affixed to said Fresnel lens.

7. The apparatus of claim 6, wherein said opposite side of said hologram is affixed to a side of said Fresnel lens opposite to said rearwardly facing direction.

8. The apparatus of claim 5, wherein:

one side of said hologram is formed integrally on said substrate and an opposite side of said hologram is flat;

said Fresnel lens has a flat side opposite to said rearwardly facing direction; and, said flat sides of said hologram and said Fresnel lens are affixed to one another, forming a laminated screen for said apparatus.

9. A method for manufacturing a screen for a projection-type video display apparatus, comprising the steps of:

forming a three-dimensional hologram on a substrate in an orientation adapted to enable light received from a first side of said hologram to be controllably dispersed into said substrate from a second side of said hologram; and, affixing said first side of said hologram to a Fresnel lens in an orientation adapted to receive light transmitted through said Fresnel lens, thereby forming a laminated screen, whereby images projected onto said Fresnel lens are viewable on said second side of said substrate; and, disposing an array of lenticular elements on a first side of a layer to form said Fresnel lens, said lenticular elements extending in a direction opposite to a flat second side of said layer; and, affixing said first side of said hologram to said flat second side of said layer.

* * * * *